May 21, 1929.  C. C. FARMER  1,714,011
FLUID PRESSURE BRAKE
Filed Sept. 12, 1927
Fig. 1.
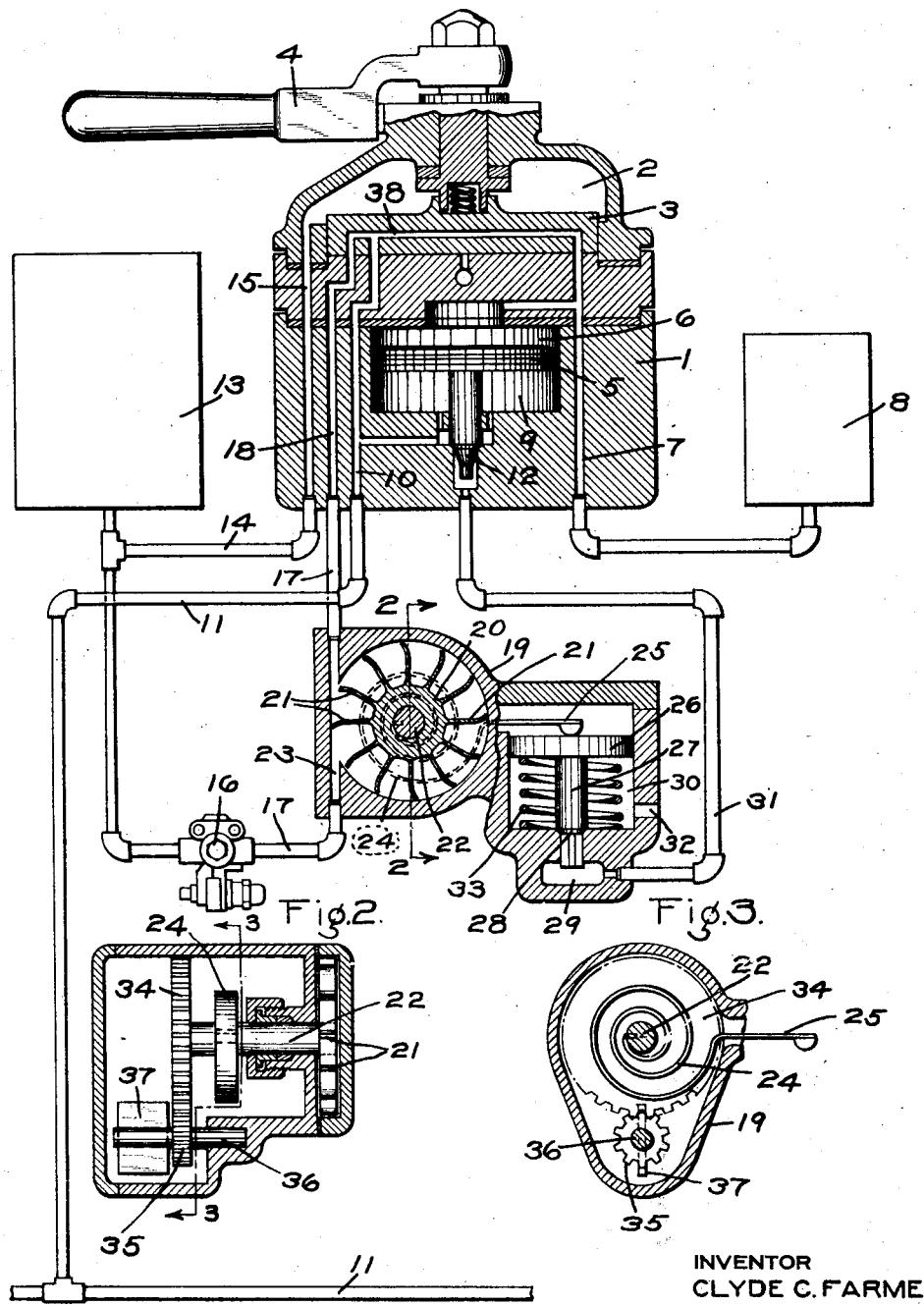
Fig. 2.
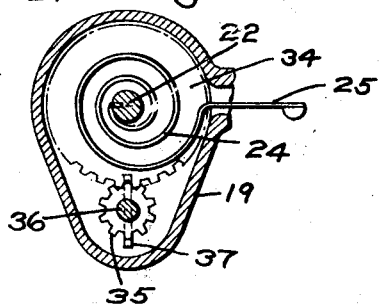
Fig. 3.
INVENTOR
CLYDE C. FARMER
BY *Wm. M. Cady*
ATTORNEY Patented May 21, 1929.

1,714,011

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 12, 1927. Serial No. 218,923.

This invention relates to fluid pressure brakes, and more particularly to an automatic brake system in which the brakes are applied by effecting a reduction in brake pipe pressure.

On a long train of say 100 cars, with the brake valve in running position and the usual feed valve device functioning to maintain the brake pipe pressure, while the brake pipe pressure at the head of the train is maintained at the standard, leakage from the brake pipe prevents the pressure from being built up to the standard at the rear of the train and the pressure in the brake pipe at the rear of the train is thus less than the standard pressure in proportion to the degree of brake pipe leakage.

When the brakes are applied by effecting a reduction in brake pipe pressure, the flow of fluid through the feed valve device to the brake pipe is cut off and this causes an equalizing flow of fluid through the brake pipe from the head end of the train toward the rear. The result is that the brake pipe pressure is reduced at the head end of the train both by flow from the head to the rear and by the venting of fluid from the brake pipe by operation of the brake valve device to effect a reduction in brake pipe pressure.

If the leakage be excessive and the brake pipe reduction at the brake valve be heavy, then the total rate of reduction in brake pipe pressure at the head end of the train may be such that a heavy braking force may be rapidly developed at the head end while the brakes are only lightly applied at the rear end. As a consequence the cars at the rear end tend to run into the heavily braked cars at the front end and thus cause damaging shocks.

The principal object of my invention is to provide means for obviating the above action in controlling the fluid pressure brakes on long trains.

In the accompanying drawing; Fig. 1 is a diagrammatic sectional view of a fluid pressure brake equipment embodying my invention; Fig. 2 a section on the line 2—2 of Fig. 1; and Fig. 3 a section on the line 3—3 of Fig. 2.

The equipment shown in Fig. 1 comprises a brake valve device 1 having a valve chamber 2 containing the usual rotary valve 3 adapted to be operated by handle 4. The brake valve device is also provided with the usual equalizing discharge valve mechanism comprising a piston 5 having the chamber 6 at one side connected through passage 7 with the usual equalizing reservoir 8 and the chamber 9 at the opposite side connected through passage 10 with the usual train brake pipe 11. The piston 5 is adapted to operate a brake pipe discharge valve 12 for venting fluid from the brake pipe.

The usual main reservoir 13 is connected through pipe 14 and passage 15 to the rotary valve chamber 2 and the usual feed valve device 16 is provided for supplying fluid at the standard pressure carried to the brake pipe by way of pipe 17 and passage 18.

According to my invention, there is interposed in the pipe 17 a device 19 comprising a casing containing a wheel 20 having vanes 21, the wheel being carried by a shaft 22 and so mounted that the vanes 21 project into the passage 23, through which the flow of fluid from the feed valve device 16 is supplied to the brake valve device 1.

A spiral spring 24 is secured to the shaft 22 and is provided with an extension 25 which engages the face of a disk 26. Said disk is provided with a valve stem 27 having a valve 28 which is adapted to control communication from a chamber 29 to a chamber 30 at one side of the disk 26. Chamber 29 is connected by a pipe 31 with the discharge outlet of the discharge valve 12 and chamber 30 is open to the atmosphere through a port 32. The disk 26 is subject to the pressure of a coil spring 33 which tends to move the valve 28 away from its seat.

A gear wheel 34 is secured to the end of the shaft 22 and meshes with a pinion 35 secured to a shaft 36. In the shaft 36 is a paddle 37.

In the running position of the brake valve device, the feed valve device 16 supplies fluid under pressure to the brake pipe 11 through pipe 17, passage 18, cavity 38 in the rotary valve 3 and passage 10. The equalizing reservoir 8 is also charged with fluid under pressure through cavity 38 and passage 7.

When fluid is flowing through passage 23, the flow acts on the vanes 21 of the wheel 20 and tends to rotate the wheel against the resistance of the spiral spring 24. The extent the wheel 20 is rotated depends upon the rate of flow through the passage 23, which in turn depends upon the rate of leakage of fluid from the brake pipe throughout the train.

As a consequence, a spring pressure is transmitted through the spring extension 25 to the disk 26, which opposes the opening of valve 28.

When the brake valve device is moved to service position to effect a service application of the brakes, the flow of fluid from the feed valve device 16 to the brake pipe 11 is cut off, and fluid is vented from the equalizing reservoir 8, so that the equalizing piston 5 is operated in the usual manner to open the discharge valve 12, so that fluid is vented from the brake pipe through pipe 31 to chamber 29.

When the flow of fluid through passage 23 ceases, the vanes 21 are relieved of pressure tending to rotate same, and the spiral spring 24 tends to rotate the wheel 20 in the reverse direction, but this movement is retarded, due to the rotation of the paddle 37 through the gears 34 and 35.

It therefore requires a certain time period for the wheel 20 to rotate sufficiently to relieve the disk of the pressure exerted by the spring 24 and when this occurs, the spring 33 operates on the disk 26 to open the valve 28. Fluid discharged from the brake pipe 11 through pipe 31 is then vented at the port 32, so that the brake pipe pressure is reduced to effect an application of the brakes.

The greater the leakage from the brake pipe, the greater the extent the spring 24 is wound up and the longer the time period required to unwind the spring and permit the valve 28 to open. Thus, the start of the reduction in brake pipe pressure, in effecting an application of the brakes, is delayed to an extent proportional to the amount of leakage from the brake pipe. The venting of fluid from the brake pipe at the engineer's brake valve being delayed for a time depending upon the extent of brake pipe leakage, it will be seen that during this time period, the equalization of the higher pressure in the brake pipe at the head end of the train with the lower pressure at the rear of the train can take place and the too rapid reduction in brake pipe pressure is prevented, as would be occasioned by the venting of fluid from the brake pipe at the brake valve simultaneously with the reduction in brake pipe pressure at the head end due to flow toward the rear end.

If there is no leakage of fluid from the brake pipe, the wheel 20 will not be rotated, and consequently the spring 24 will not exert pressure on the disk 26. As a result, the spring 33 will act on the disk 26 to hold the valve 28 open, so that when the brake valve device 1 is operated to effect a reduction in brake pipe pressure, the brake pipe pressure will be reduced in the usual manner as soon as the brake valve is turned to service position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe and a brake valve device operative to effect a reduction in brake pipe pressure, of means for delaying the venting of fluid from the brake pipe for a period of time proportional to the rate of leakage from the brake pipe.

2. In a fluid pressure brake, the combination with a brake pipe and a brake valve device operative to effect a reduction in brake pipe pressure, of means for delaying the venting of fluid from the brake pipe by operation of the brake valve device for a period of time proportional to the rate of leakage from the brake pipe.

3. In a fluid pressure brake, the combination with a brake pipe and a brake valve device for venting fluid under pressure from the brake pipe to effect an application of the brakes, of a valve for controlling the discharge of fluid vented from the brake pipe and means for holding said valve closed for a time period proportional to the rate of leakage from the brake pipe.

4. In a fluid pressure brake, the combination with a brake pipe and a brake valve device for venting fluid under pressure from the brake pipe to effect an application of the brakes, of a valve for controlling communication through which fluid vented from the brake pipe by operation of the brake valve device is vented to the atmosphere, and timing means for delaying the opening of said valve.

5. In a fluid pressure brake, the combination with a brake pipe and a brake valve device for venting fluid under pressure from the brake pipe to effect an application of the brakes, of a valve for controlling communication through which fluid vented from the brake pipe by operation of the brake valve device is vented to the atmosphere, and timing means for delaying the opening of said valve for a period of time proportional to the rate of leakage from the brake pipe.

6. In a fluid pressure brake, the combination with a brake pipe, of a valve for controlling the discharge of fluid under pressure from the brake pipe in effecting an application of the brakes, means for normally supplying fluid under pressure to the brake pipe, means rotatable in proportion to the rate of flow of fluid to the brake pipe, and means for exerting a pressure to hold said valve seated in proportion to the extent of rotation of said rotatable means.

7. In a fluid pressure brake, the combination with a brake pipe, of a valve for controlling the discharge of fluid under pressure from the brake pipe in effecting an application of the brakes, means for normally supplying fluid under pressure to the brake pipe, means rotatable in one direction by the flow of fluid to the brake pipe, means operated by said rotatable means for exerting a pressure to hold said valve seated, and means for retarding the rotation of said rotatable means in the reverse direction.

8. In a fluid pressure brake, the combination with a brake pipe, of valve means for controlling the discharge of fluid from the brake pipe in effecting an application of the brakes, means for normally maintaining the brake pipe pressure against leakage, and means operated by the flow of fluid to the brake pipe for holding said valve means closed.

9. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, and means for resisting the rotation of said wheel by the flow of fluid to the brake pipe and for opposing the opening of said valve means.

10. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, and means for yieldingly resisting the rotation of said wheel by the flow of fluid to the brake pipe and for also resisting the opening of said valve means.

11. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, and a spring acting on said valve means and yieldingly resisting the rotation of said wheel by the flow of fluid to the brake pipe.

12. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, means for yieldingly resisting the rotation of said wheel and the opening of said valve means, and means for retarding the rotation of said wheel by said yielding means.

13. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, a spring acting on said valve means and yieldingly resisting the rotation of said wheel by flow of fluid to the brake pipe, and means operatively connected to said wheel for retarding rotative movement of the wheel by action of the spring when flow of fluid to the brake pipe ceases.

14. In a fluid pressure brake, the combination with a brake pipe, of valve means for controlling the discharge of fluid from the brake pipe in effecting an application of the brakes, means for normally maintaining the brake pipe pressure against leakage, a wheel having vanes subject to the flow of fluid to the brake pipe, a spring acting on said valve means and adapted to be wound up by rotation of said wheel and means for retarding the unwinding of said spring.

In testimony whereof I have hereunto set my hand.

CLYDE C. FARMER.